UNITED STATES PATENT OFFICE.

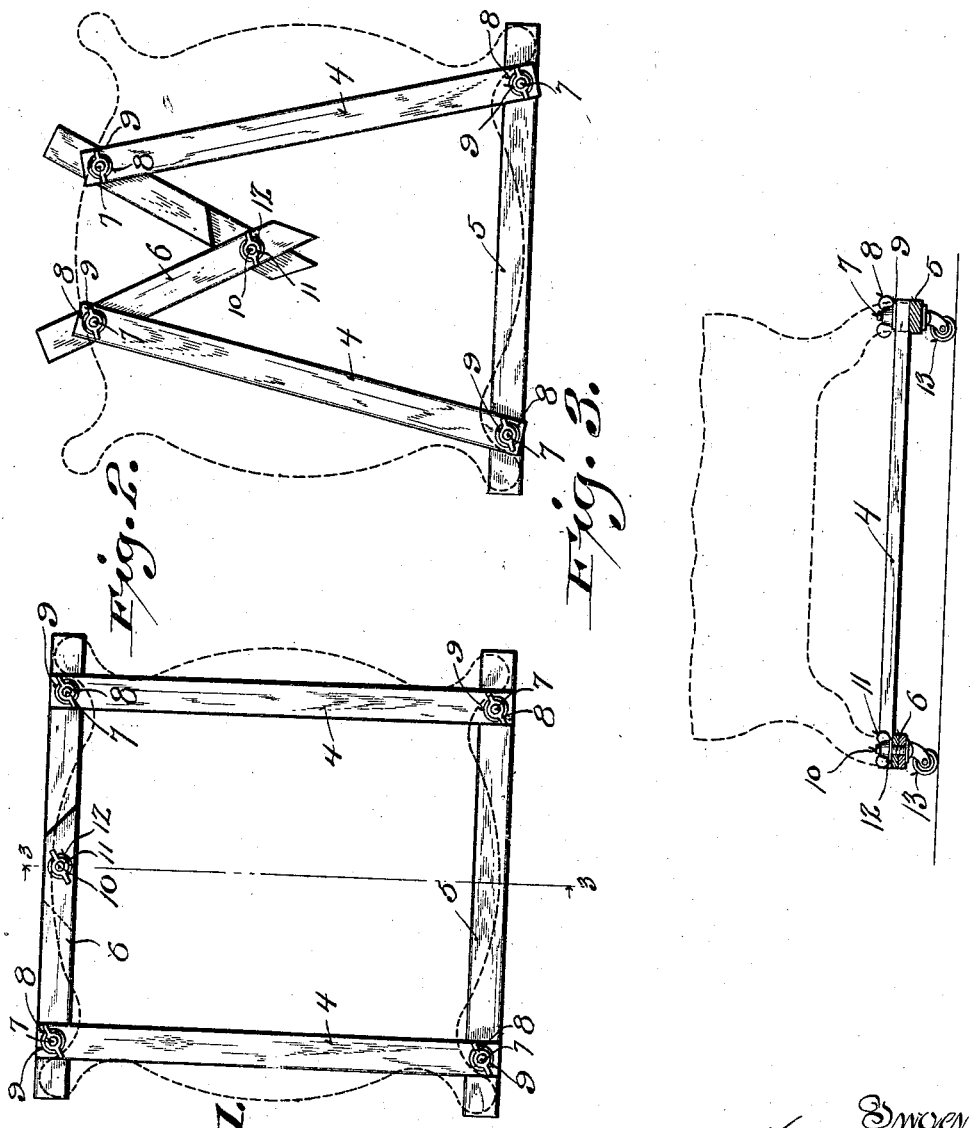

HENRY ZARLING, OF SHEBOYGAN, WISCONSIN.

TRUCK.

1,019,114.      Specification of Letters Patent.      Patented Mar. 5, 1912.

Application filed October 10, 1911. Serial No. 653,842.

*To all whom it may concern:*

Be it known that I, HENRY ZARLING, a citizen of the United States, and resident of Sheboygan, in the county of Sheboygan and State of Wisconsin, have invented certain new and useful Improvements in Trucks; and I do hereby declare that the following is a full, clear, and exact description thereof.

My invention consists in what is herein particularly set forth with reference to the accompanying drawings and pointed out in the claim of this specification, its object being to provide simple, economical and efficient preferably knockdown trucks especially designed for moving stoves.

Figure 1 of the drawings represents a plan view of a stove-truck in accordance with my invention extended; Fig. 2, a similar view of the same collapsed, and Fig. 3, a cross-section of the truck on the plane indicated by line 3—3 in Fig. 1; a stove being indicated by dotted lines in each illustration.

Referring by numerals to the drawings, 4, 4 and 5 indicate three rigid bars and 6 a jointed bar of the frame of a stove-truck in accordance with my invention, this frame being quadrangular when extended. The bars 4—4 are superimposed on the ones 5 and 6 to which they are pivotally connected at their ends. The ends of the bars 5 and 6 extend beyond the bars 4—4 to serve as rests for the legs of a stove set upon the truck, and it is preferable, as herein shown to employ bolts 7 and thumb-nuts 8 as the means for pivotally connecting the bars aforesaid, washers 9 being preferably provided on said bolts in opposition to their heads and said nuts.

The bar 6 comprises two sections in rule-joint union between the bars 4—4, the pivot of the joint being preferably a bolt 10 having a thumb-nut 11 run thereon, and washers 12 are preferably provided on said bolt in opposition to its head and said nut.

From the foregoing it will be understood that I provide a collapsible and preferably knockdown frame, and this frame is mounted on casters 13 in connection with the ends of its bars 5 and 6, to therewith constitute a truck.

In practice, the truck is first collapsed, by breaking in of the frame-bar 6, so as to permit of said truck being slid under a stove, as shown in Fig. 2, two of the stove legs are then set on the protruding ends of the frame-bar 5, the truck extended and the remaining legs of said stove set upon the protruding ends of the jointed frame-bar 6. The stove is now mounted on the truck and can be easily moved from one place to another.

The bars of the frame of the truck being separable, said truck may be readily knocked down to economize shipping and storage space, which same is also economized by collapsing the aforesaid truck.

I claim:

A truck comprising a collapsible frame consisting of a pair of rigid bars, another rigid bar and a jointed bar upon which those aforesaid are superimposed and pivotally connected at their ends, the ends of the under bars being extended beyond the upper bars; and casters in connection with said frame.

In testimony that I claim the foregoing I have hereunto set my hand at Sheboygan in the county of Sheboygan and State of Wisconsin in the presence of two witnesses.

HENRY ZARLING.

Witnesses:
   LOUIS GRASSE,
   IRENE D. HANSON.

Copies of this patent may be obtained for five cents each, by addressing the "Commissioner of Patents, Washington, D. C."